United States Patent
Buettgen et al.

(10) Patent No.: US 9,442,196 B2
(45) Date of Patent: Sep. 13, 2016

(54) DEMODULATION SENSOR WITH SEPARATE PIXEL AND STORAGE ARRAYS

(75) Inventors: Bernhard Buettgen, Adliswil (CH); Thierry Oggier, Zurich (CH)

(73) Assignee: Heptagon Micro Optics Pte. Ltd., Singapore (SG)

( * ) Notice: Subject to any disclaimer, the term of this patent is extended or adjusted under 35 U.S.C. 154(b) by 491 days.

(21) Appl. No.: 12/985,737

(22) Filed: Jan. 6, 2011

(65) Prior Publication Data

US 2011/0164132 A1    Jul. 7, 2011

Related U.S. Application Data

(60) Provisional application No. 61/292,588, filed on Jan. 6, 2010.

(51) Int. Cl.
  *H01L 27/146* (2006.01)
  *H04N 7/18* (2006.01)
  (Continued)

(52) U.S. Cl.
  CPC ............. *G01S 17/89* (2013.01); *G01S 7/4914* (2013.01); *G01S 7/4918* (2013.01); *G01S 17/36* (2013.01)

(58) Field of Classification Search
  CPC ...... G01S 17/36; G01S 17/89; G01S 7/4914; G01S 7/4918
  USPC ............... 348/308, 135; 250/208.1; 382/261; 600/160
  See application file for complete search history.

(56) References Cited

U.S. PATENT DOCUMENTS 5,054,911 A    10/1991 Ohishi et al.
5,856,667 A    1/1999 Spirig et al.
(Continued)

FOREIGN PATENT DOCUMENTS

DE    197 04 496 A1    3/1998
EP    1 513 202 A1    3/2005
(Continued)

OTHER PUBLICATIONS

International Preliminary Report on Patentability dated Jul. 19, 2012 from counterpart International Application No. PCT/US2011/020343, filed Jan. 6, 2011.
(Continued)

*Primary Examiner* — Christopher S Kelley
*Assistant Examiner* — Deirdre Beasley
(74) *Attorney, Agent, or Firm* — Fish & Richardson P.C.

(57) ABSTRACT

A demodulation image sensor, such as used in time of flight (TOF) cameras, extracts all storage- and post-processing-related steps from the pixels to another array of storage and processing elements (proxels) on the chip. The pixel array has the task of photo-detection, first processing and intermediate storage, while the array of storage and processing elements provides further processing and enhanced storage capabilities for each pixel individually. The architecture can be used to address problems due to the down-scaling of the pixel size. Typically, either the photo-sensitivity or the signal storage capacitance suffers significantly. Both a lower sensitivity and smaller storage capacitances have negative influence on the image quality. The disclosed architecture allows for keeping the storage capacitance unaffected by the pixel down-scaling. In addition to that, it provides a high degree of flexibility in integrating more intelligence into the image sensor design already on the level of the pixel array. In particular, if applied to demodulation pixels, the flexibility of the architecture allows for integrating on sensor-level concepts for multi-tap sampling, mismatch compensation, background suppression and so on, without any requirement to adjust the particular demodulation pixel architecture.

17 Claims, 13 Drawing Sheets

(51) Int. Cl.
  *G01S 17/89* (2006.01)
  *G01S 17/36* (2006.01)
  *G01S 7/491* (2006.01)

(56) References Cited

U.S. PATENT DOCUMENTS

| | | | |
|---|---|---|---|
| 6,078,037 A * | 6/2000 | Booth, Jr. | 250/208.1 |
| 6,503,195 B1 * | 1/2003 | Keller et al. | 600/160 |
| 6,809,666 B1 * | 10/2004 | Ewedemi et al. | 341/97 |
| 6,825,455 B1 | 11/2004 | Schwarte | |
| 7,038,820 B1 * | 5/2006 | Kindt et al. | 358/474 |
| 7,462,808 B2 * | 12/2008 | Lustenberger et al. | 250/208.1 |
| 7,498,621 B2 | 3/2009 | Seitz | |
| 8,159,587 B2 * | 4/2012 | Deschamps et al. | 348/308 |
| 8,203,699 B2 | 6/2012 | Bamji et al. | |
| 2002/0084430 A1 | 7/2002 | Bamji et al. | |
| 2007/0057209 A1 | 3/2007 | Kurihara et al. | |
| 2008/0117661 A1 * | 5/2008 | Holtzclaw et al. | 365/96 |
| 2008/0239466 A1 | 10/2008 | Buettgen | |
| 2009/0021617 A1 | 1/2009 | Oggier et al. | |
| 2009/0153715 A1 * | 6/2009 | Deschamps et al. | 348/308 |
| 2009/0161979 A1 * | 6/2009 | Kim | 382/261 |
| 2009/0303553 A1 * | 12/2009 | Sugiyama | 358/482 |
| 2010/0026838 A1 * | 2/2010 | Belenky et al. | 348/229.1 |
| 2010/0157447 A1 * | 6/2010 | Hamilton | 359/818 |
| 2010/0231891 A1 | 9/2010 | Mase et al. | |
| 2012/0307232 A1 | 12/2012 | Mase et al. | |

FOREIGN PATENT DOCUMENTS

| | | |
|---|---|---|
| EP | 1 777 747 A1 | 10/2005 |
| JP | 02-181689 | 7/1990 |
| JP | 2006084430 A | 3/2006 |
| JP | 2009047661 A | 3/2009 |
| JP | 2009047662 A | 3/2009 |

OTHER PUBLICATIONS

Buettgen, B. et al., "CDD/CMOS Lock-in Pixel for Range Imaging: Challenges, Limitations and State-of-the-Art," 1st Range Imaging Days, ETH Zurich, 2005, 12 pages.

Buettgen, B. et al., "Demodultion Pixel Based on Static Drift Fields," IEEE Transactions on Electron Devices, Nov. 2006, pp. 2741-2747, vol. 53, No. 11.

Buettgen, B., "Extending Time-of-Flight Optical 3D-Imaging to Extreme Operating Conditions," Ph.D. Thesis, University of Neuchatel, 2006.

Durini, D. et al., "Lateral drift-field photodiode for low noise, high-speed, large photoactive-area CMOS imaging applications," Nuclear Instruments and Methods in Physics Research Section A: Accelerators, Spectrometers, Detectors and Associated Equipment, Dec. 2010, pp. 470-475, vol. 624, No. 2, Elsevier B.V.

Lange, R., "3D Time-of-Flight Distance Measurement with Custom Solid-State Image Sensors in CMOS/CCD-Technology," Ph.D. Thesis, University of Siegen, 2000.

Tubert, C. et al., "High Speed Dual Port Pinned-photodiode for Time-of-Flight Imaging," International Image Sensor Workshop, 2009, 3 pages, Bergen, Norway.

Van Nieuwenhove, D. et al., "Novel Standard CMOS Detector using Majority Current for guiding Photo-Generated Electrons towards Detecting Junctions," Proceedings Symposium IEEE/LEOS Benelux Chapter, 2005.

International Search Report and the Written Opinion of the International Searching Authority mailed Jun. 21, 2011, from counterpart International Application No. PCT/US2011/020343, filed on Jan. 6, 2011.

\* cited by examiner

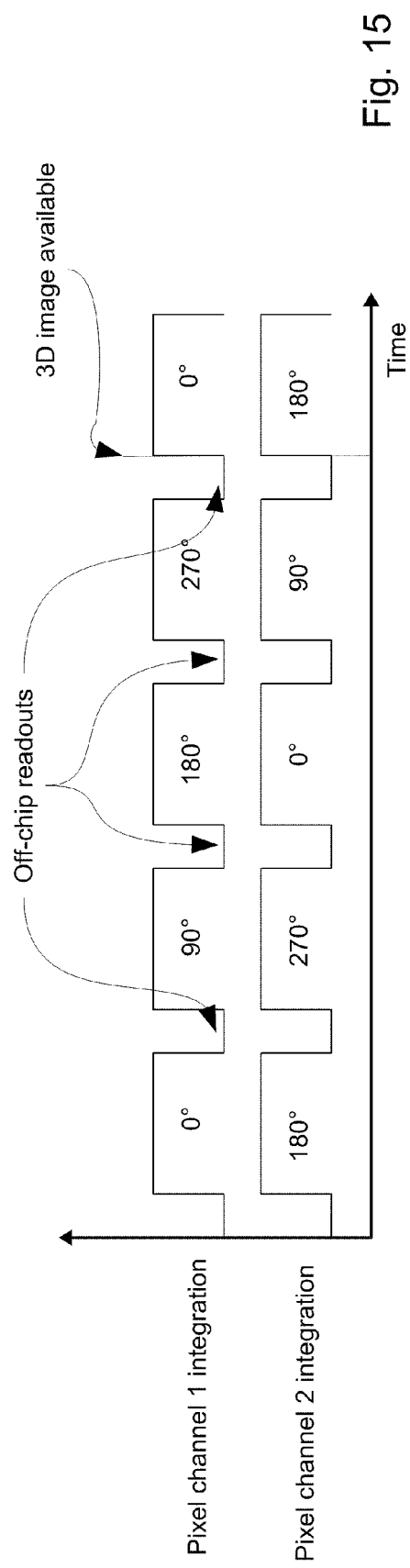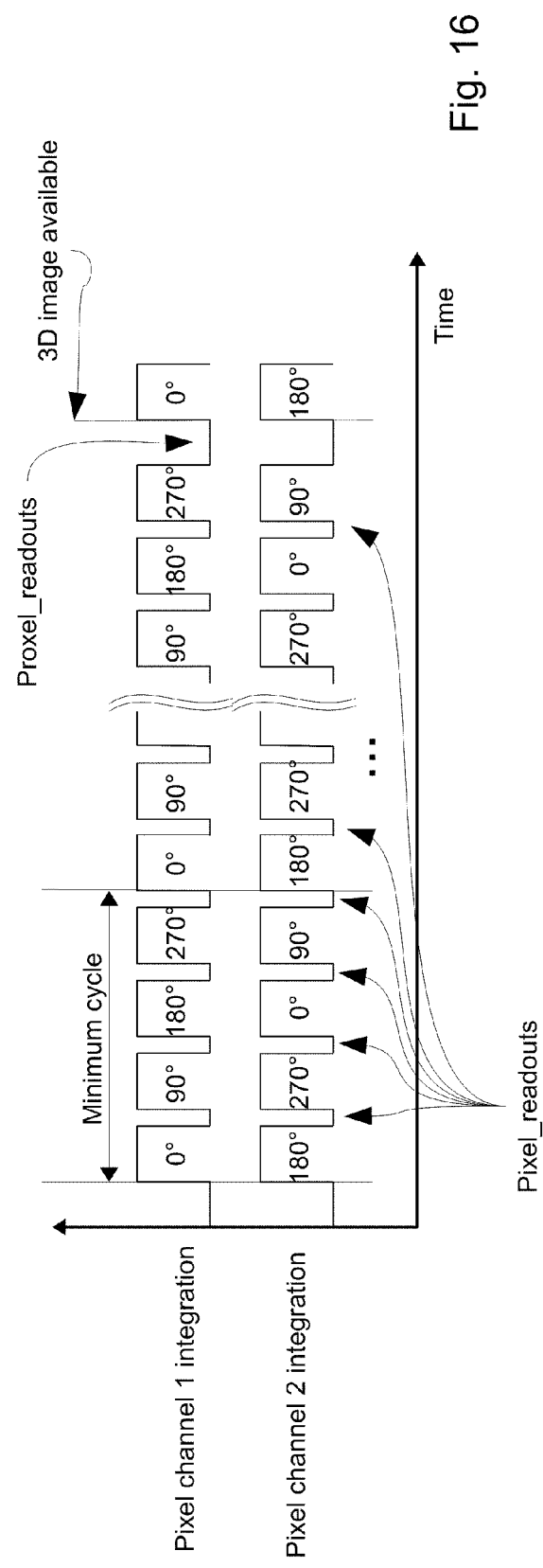

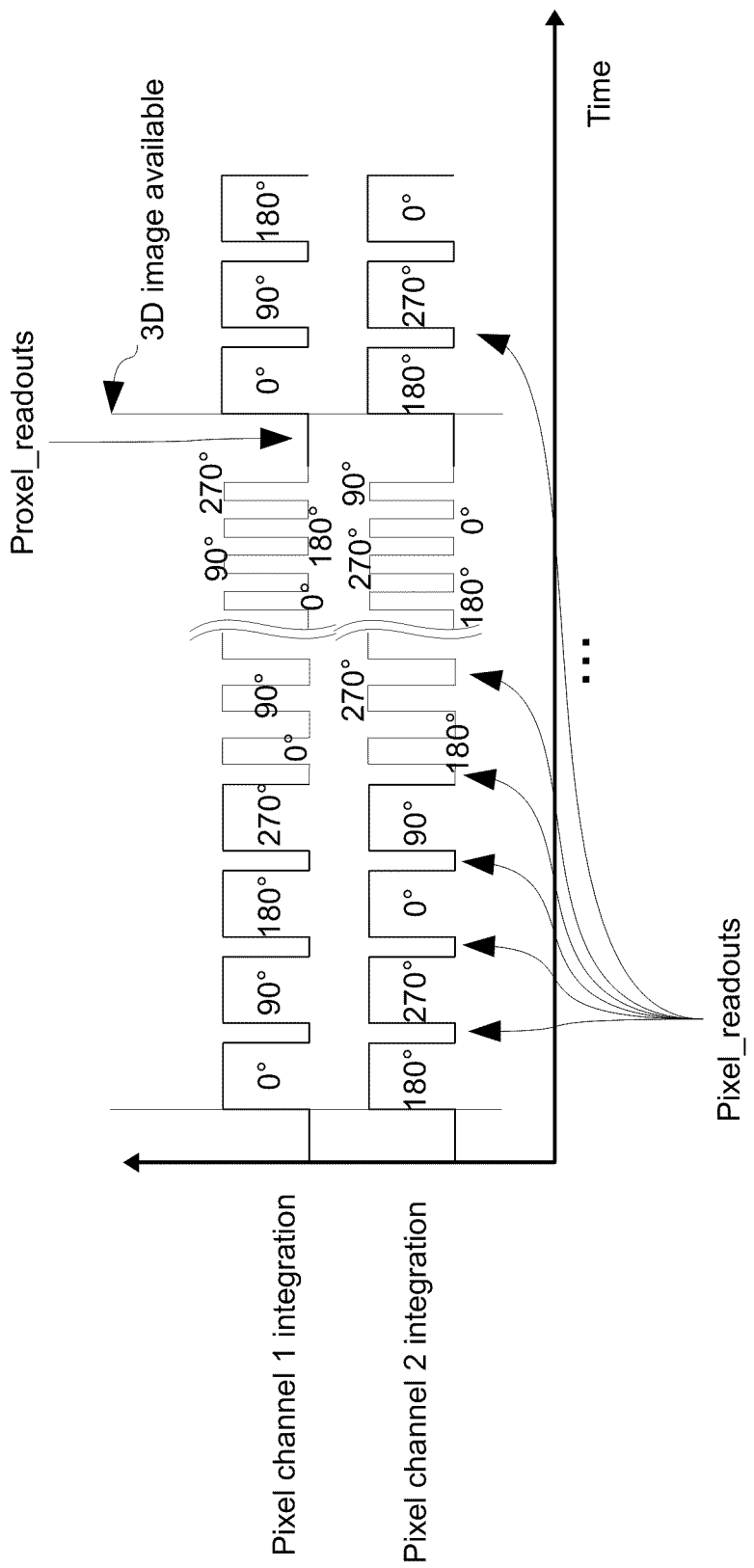

DEMODULATION SENSOR WITH SEPARATE PIXEL AND STORAGE ARRAYS

RELATED APPLICATIONS

This application claims the benefit under 35 USC 119(e) of U.S. Provisional Application No. 61/292,588, filed on Jan. 6, 2010, which is incorporated herein by reference in its entirety.

BACKGROUND OF THE INVENTION

Electronic imaging sensors usually have an array of m×n photo-sensitive pixels, with x>=1 rows and y>=1 columns. Each pixel of the array can individually be addressed by dedicated readout circuitry for column-wise and row-wise selection. Optionally a block for signal post-processing is integrated on the sensor.

The pixels typically have four basic functions: photo detection, signal processing, information storage, and analog or digital conversion. Each of these functions consumes a certain area on the chip.

A special group of smart pixels, called demodulation pixels, is well-known for the purpose of three dimensional (3D) imaging. Other applications of such demodulation pixels include fluorescence life-time imaging (FLIM). The pixels of these demodulation imaging sensors typically demodulate the incoming light signal by means of synchronous sampling or correlating the signal. Hence, the signal processing function is substituted more specifically by a sampler or a correlator. The output of the sampling or correlation process is a number n of different charge packets or samples (A0, A1, A3 . . . ) for each pixel. Thus, n storage sites are used for the information storage. The typical pixel output in the analog domain is accomplished by standard source follower amplification. However, analog to digital converters could also be integrated at the pixel-level.

The image quality of demodulation sensors is defined by the per-pixel measurement uncertainty. Similar to standard 2D imaging sensors, a larger number of signal carriers improves the signal-to-noise ratio and thus the image quality. For 3D imaging sensors, more signal carriers mean lower distance uncertainty. In general, the distance measurement standard deviation σ shows an inverse proportionality either to the signal A or to the square root of the signal, depending whether the photon shot noise is dominant or not.

$$\sigma \propto \frac{1}{\sqrt{A}}$$

if photon shot noise is dominant $$\sigma \propto \frac{1}{A}$$

if other noise sources are dominant

SUMMARY OF THE INVENTION

A common problem for all demodulation pixels used in demodulation sensors, such as for TOF imaging or FLIM, or otherwise, arises when trying to shrink the pixel size to realize arrays of higher pixel counts. Since the storage nodes require a certain area in the pixel in order to maintain adequate storage capacity and thus image quality, the pixel's fill factor suffers from the shrinking process associated with moving to these larger arrays. Thus, there is a trade-off between the storage area needed for obtaining a certain image quality and the pixel's photo-sensitivity expressed by the fill-factor parameter. In the case of a minimum achievable image quality, the minimum size of the pixel is given by the minimum size of the total storage area.

In 3D imaging, typically a few hundreds of thousands up to several million charge carriers, i.e., electrons, need to be stored in order to achieve centimeter down to millimeter resolution. This performance requirement, in turn, means that the storage nodes typically cover areas of some hundreds of square micrometers in the pixel. Consequently, pixel pitches of 10 micrometers or less become almost impossible without compromises in terms of distance resolution and accuracy.

The aforementioned trade-off problem becomes even more critical if additional post-processing logic is to be integrated on a per-pixel basis. Such post-processing could include for example analog-to-digital conversion, logic for a common signal subtraction, integrators, and differentiators, to list a few examples.

Another challenge of the demodulation pixels is the number of samples required to unambiguously derive the characteristics of the impinging electromagnetic wave. Using a sine-modulated carrier signal, the characteristics of the wave are its amplitude A, the offset B and the phase P. Hence, in this case, at least three samples need to be acquired per period. However, for design and stability reasons, most common systems use four samples. Implementing a pixel capable of capturing and storing n=4 samples requires in general the four-fold duplication of electronics per pixel such as storage and readout electronics. The result is the further increase in the electronics per pixel and a further reduction in fill factor.

In order to avoid this loss in sensitivity, most common approaches use so-called 2-tap pixels, which are demodulation pixels able to sample and store two samples within the same period. Such type of pixel architectures are ideal in terms of sensitivity, since all the photo-electrons are converted into a signal and no light is wasted, but on the other hand, it requires at least two consequent measurements to get the four samples. Due to sampling mismatches and other non-idealities, even four images might be required to cancel or at least to reduce pixel mismatches. Such an approach has been presented by Lustenberger, Oggier, Becker, and Lamesch, in U.S. Pat. No. 7,462,808, entitled Method and device for redundant distance measurement and mismatch cancellation in phase measurement systems, which is incorporated herein by this reference in its entirety. Having now several images taken and combined to deduce one depth image, motion in the scene or a moving camera renders artifacts in the measured depth map. The more those different samples are separated in time, the worse the motion artifacts are.

The presented invention solves the problem of shrinking the pixel size without significantly reducing the pixel's fill factor and without compromising the image quality by making the storage nodes even smaller. The solution even provides the possibility for almost arbitrary integration of any additional post-processing circuitry for each pixel's signals individually. Furthermore, it can reduce the motion artifacts of time-of-flight cameras to a minimum.

In general, according to one aspect, the invention features a demodulation sensor comprising a pixel array comprising pixels that each produce at least two samples and a storage or proxel array comprising processing and/or storage elements, each of the storage elements receiving the at least two samples from a corresponding one of the pixels.

In embodiments, the pixels comprise photosensitive regions in which incoming light generates charge carriers and demodulators/correlators that transfer the charge carriers among multiple storage sites.

A transfer system is preferably provided that transfers the samples generated by the pixels to the corresponding storage elements. In examples, the transfer system analog to digitally converts the samples received by the storage elements.

In some cases, the storage elements monitor storage nodes that receive the samples for saturation. Different sized storage nodes can also be provided that receive the samples. Mismatch cancellation can also be performed along with post processing to determine depth information.

In general, according to another aspect, the invention features a time of flight camera system comprising a light source that generates modulating light and a demodulation sensor. The sensor includes a pixel array comprising pixels that each produce at least two samples of the modulated light and a storage array comprising storage elements. Each of the storage elements receives the at least two samples from a corresponding one of the pixels.

In general, according to another aspect, the invention features a demodulation method comprising: detecting modulated light in a pixel array comprising pixels that each produce at least two samples of the modulated light, transferring the at least two samples from each of the pixels to a storage array, and receiving the at least two samples in storage elements of the storage array from a corresponding one of the pixels.

The above and other features of the invention including various novel details of construction and combinations of parts, and other advantages, will now be more particularly described with reference to the accompanying drawings and pointed out in the claims. It will be understood that the particular method and device embodying the invention are shown by way of illustration and not as a limitation of the invention. The principles and features of this invention may be employed in various and numerous embodiments without departing from the scope of the invention.

BRIEF DESCRIPTION OF THE DRAWINGS

In the accompanying drawings, reference characters refer to the same parts throughout the different views. The drawings are not necessarily to scale; emphasis has instead been placed upon illustrating the principles of the invention. Of the drawings:

FIG. 15 shows a timing of a 3D image acquisition based on a state-of-the-art 2-tap demodulation with 2-tap pixel without employing the invention;

FIG. 16 shows the corresponding timing diagram of FIG. 15 based on the new approach with separate pixel and proxel arrays;

FIG. 17 shows a timing diagram of a 2-tap pixel with proxels with varying exposure times.

DETAILED DESCRIPTION OF THE PREFERRED EMBODIMENTS

Figure 1:
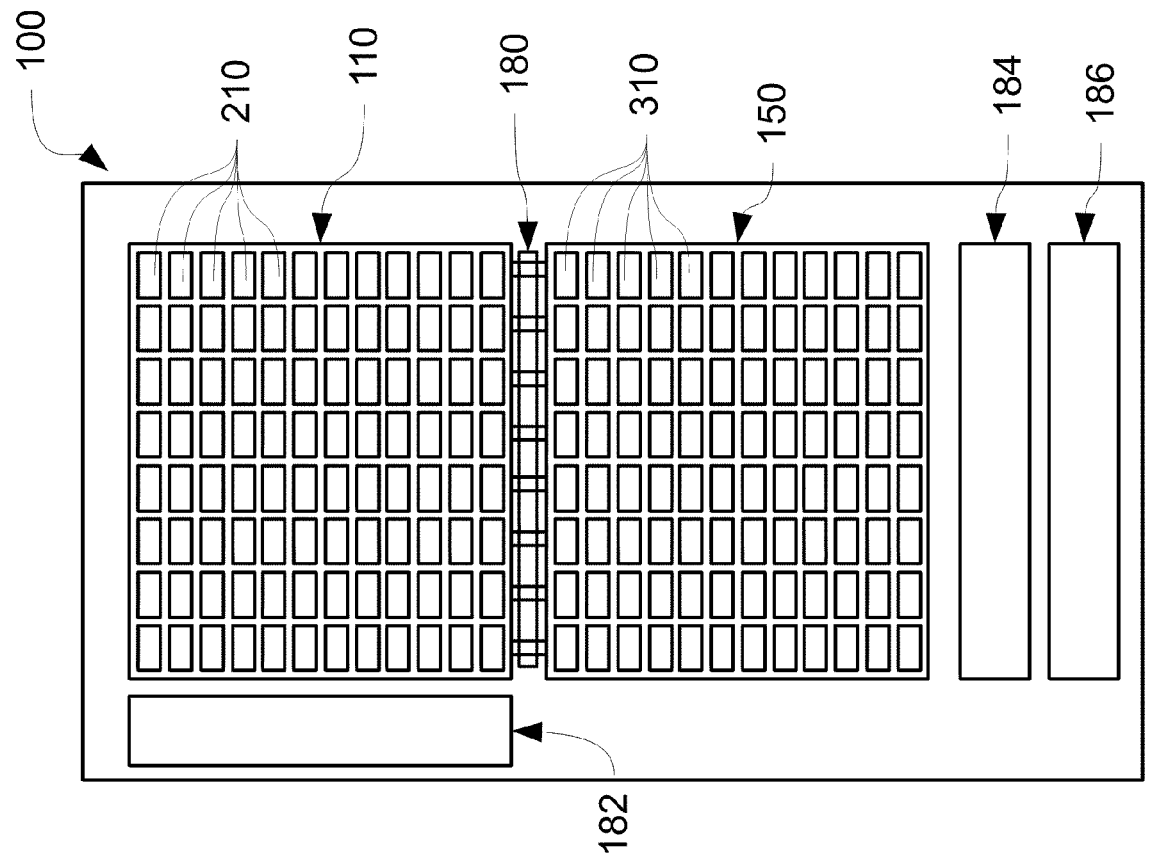
FIG. 1 is a schematic diagram showing an electronic imaging sensor including a photo-sensitive pixel array and a separate storage or proxel array, which provides additional processing functionality and the final storage and readout capability for each pixel.

FIG. 1 shows a demodulation sensor 100 that has been constructed according to the principles of the present invention.

The illustrated architecture extracts elements, which are typically integrated inside the pixel but not necessarily required for the photo detection, out of the pixel into physically separated elements that are basically storage and sometimes processing elements, termed storage elements or proxels. As a consequence, the sensor includes a pixel array 110 of x×y pixels and a storage or proxel array 150 of x×y of storage elements or proxels 310 that are used for further processing, storage of the information and readout. Usually x and y are greater than 100, and preferably greater than 200. In some examples x, y are greater than 1000. The two arrays are physically separated from each other in preferably discrete arrays that do not physically overlap with each other on the chip.

Multiple functions are preferably handled in this proxel array 150. Thus, the sensor 100 includes of a pixel array 110 and a proxel array 150, where each proxel 310 is linked to and associated with preferably one particular pixel 210.

It is worth mentioning that the proxel array 150 does not have to be one contiguous array. In examples the proxel array 150 is split into two, three, or four matrices that surround the pixel array 110.

The data transfer of the pixel 210 to the proxel 310 is controlled by the pixel readout decoder 182 and transferred through the transfer or connection system 180. The pixel readout decoder 182 selects the pixel 210 and establishes the connection 180 to the corresponding proxel 310. Preferably, the readout of the pixel field 110 is done row-wise. Hence, the readout decoder selects at least one row of the pixel field 110 which is then connected to the corresponding rows of proxels 310 in the proxel field 150. In that case, the connection lines of the transfer or connection system 180 are shared by all pixels in a column. In order to further speed up the pixel readout, multiple rows could be selected and transferred as well.

Additionally included in the sensor 100 is the proxel readout decoder 186 for controlling the readout of the proxels. An optional signal post processing block 184 is provided for analog to digital conversion and/or calculating phase/depth information based on the n acquired samples, for example.

The transfer or connection system 180 between the pixel array 110 and the proxel array 150 includes analog to digital converters in some embodiments and the information arriving and processed at the proxel array is therefore digital.

Figure 2:
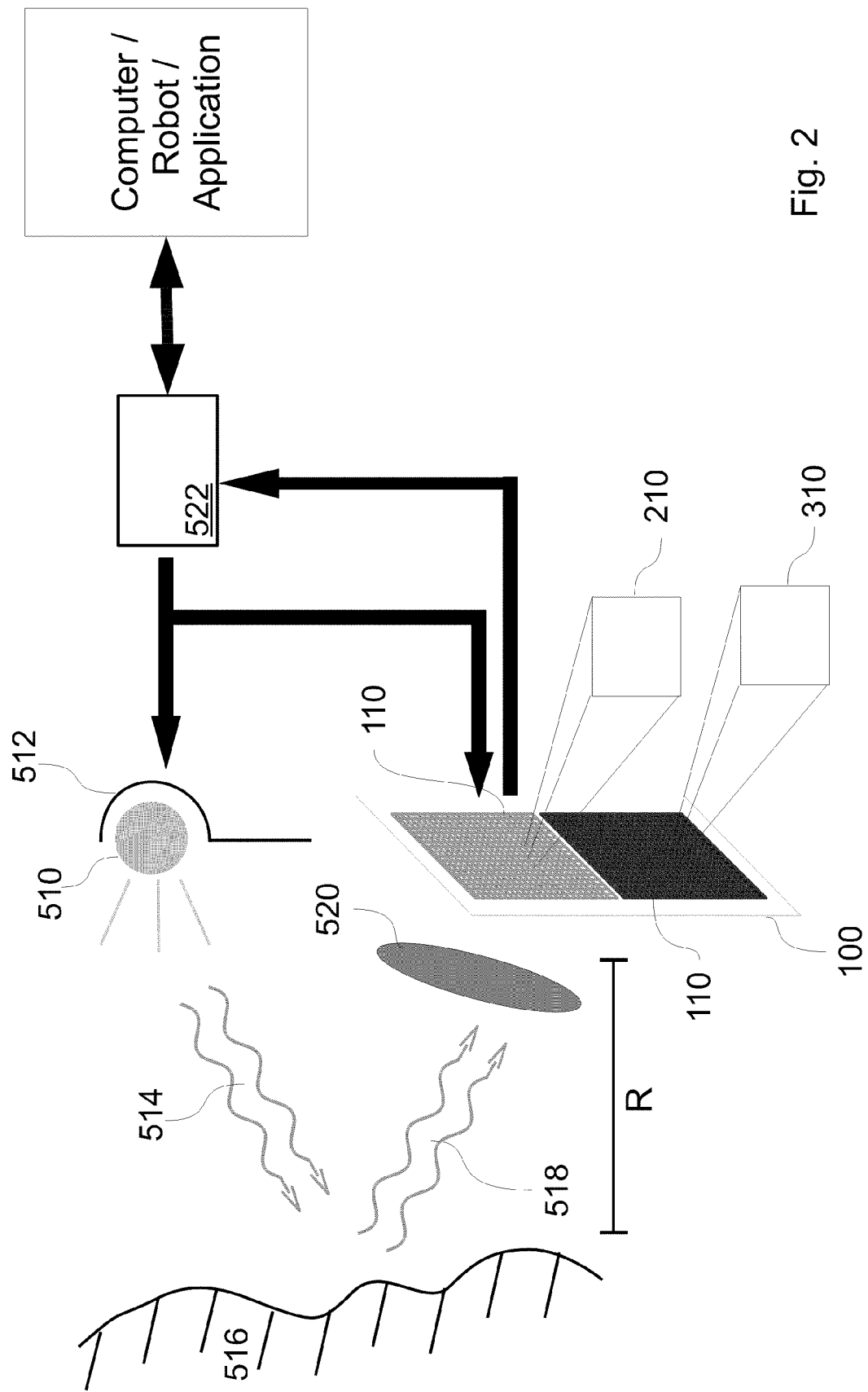
FIG. 2 illustrates the basic principle of time-of-flight cameras.

FIG. 2 shows the typical application of a 3D TOF camera that uses the inventive sensor 100.

In more detail, a light source or emitter 510 with a possible reflector or projection optics 512 produces modulated light 514 that is directed at the 3-D scene 516 at range R from the camera. The returning light 518 from the scene 516 is collected by the objective lens system 520 and possibly bandpass filtered so that only light at the wavelength emitted by the light emitter 510 is transmitted. An image is formed on the pixel array 110 of the TOF sensor 100. A control unit 522 coordinates the modulation of the light emitter 510 with the sampling of the TOF detector chip 100. This results in synchronous demodulation. That is, the samples that are generated in each of the pixels 210 of the pixel array 110 are stored in the storage buckets or sites in the pixels and/or proxels 310 in the storage or proxel array 150 synchronously with the modulation of a light emitter 510. The kind of modulation signal is not restricted to sine but for similarity, sine wave modulation only is used for illustration.

The information or samples are transferred to the storage or proxel array 150 and then readout by the control unit 522, which then reconstructs the 3-D image representation using the samples generated by the chip 100 such that a range r to the scene is produced for each of the pixels of the chip 100.

In the case of sine wave modulation, using the n=4 samples A0, A1, A2, A3 generated by each pixel/proxel, the three decisive modulation parameters amplitude A, offset B and phase shift P of the modulation signal are extracted by the equations:

$$A=\sqrt{[(A3-A1)^2+(A2-A1)^2]/2}$$

$$B=[A0+A1+A2+A3]/4$$

$$P=\arctan[(A3-A1)/(A0-A2)]$$

With each pixel 210 of the sensor 100 being capable of demodulating the optical signal at the same time, the controller unit 522 is able to deliver 3D images in real-time, i.e., frame rates of up to 30 Hertz (Hz), or even more, are possible. Continuous sine modulation delivers the phase delay (P) between the emitted signal and the received signal, which corresponds directly to the distance R:

$$R=(P*c)/(4*pi*f\,\mathrm{mod}),$$

where f mod is the modulation frequency of the optical signal 514. Typical state-of-the-art modulation frequencies range from a few MHz up to a few hundreds of MHz or even GHz.

Figure 3:
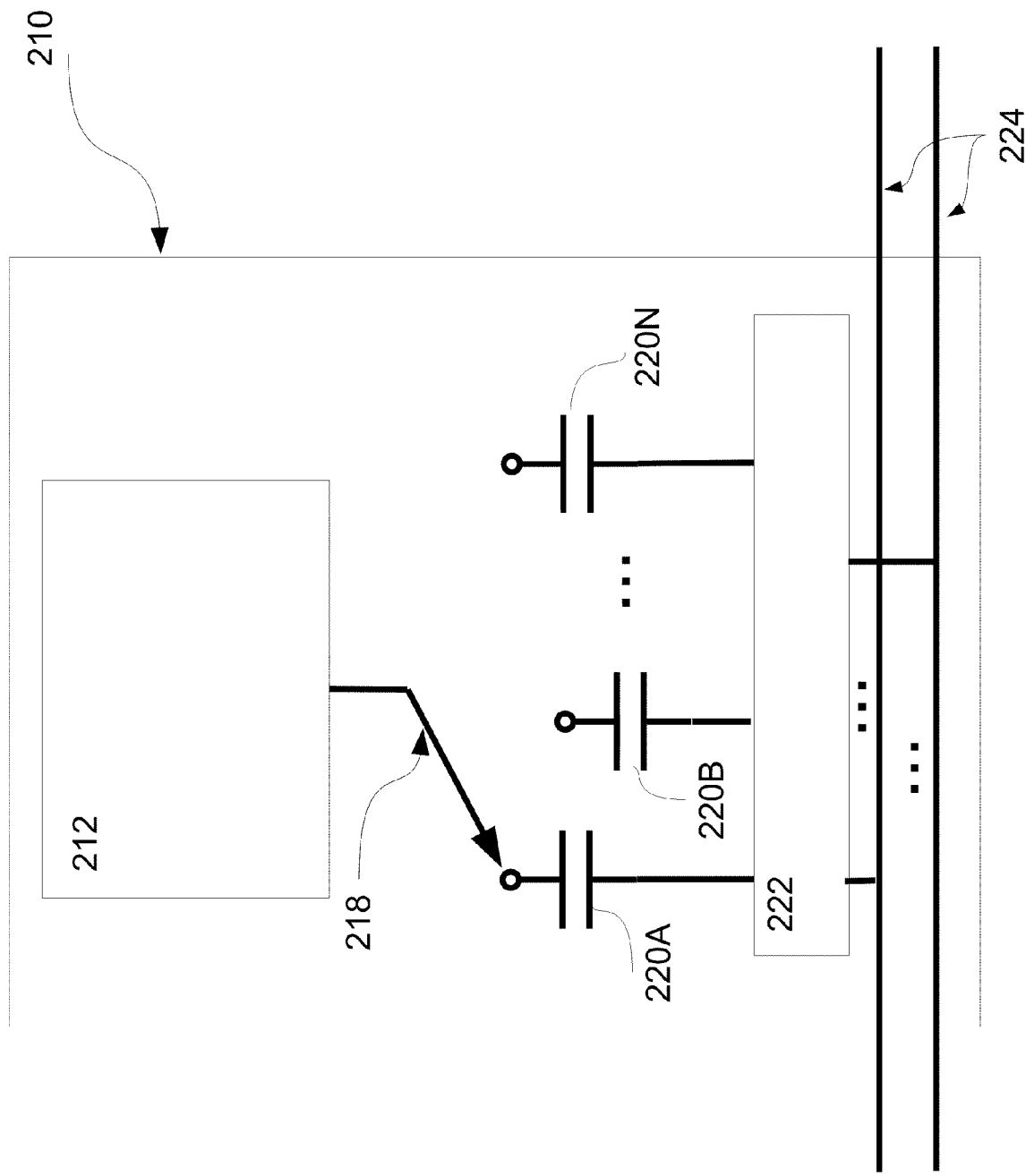
FIG. 3 is a block diagram showing the functions of a general demodulation pixel.

FIG. 3 illustrates a demodulation pixel 210 with its different functional blocks. The impinging light is converted in charge carriers in the photo-sensitive area 212 of the pixel 210. Typically a lateral electrical drift field is provided in the photo-sensitive area 212 to sweep the charge carriers to a demodulator/correlator 218, which transfers the photo-generated charges in an alternating fashion to the n different storage sites 220A, 220B to 220N. The transfer to the different storage sites 220A, 220B to 220N is typically performed synchronously with the modulation of the light source 510.

Before reading out the storage sites 220 with the n samples, many demodulation pixels include in-pixel processing 222 e.g. for common mode suppression. In its simplest form, the demodulation pixel 210 only includes a sensitive area 212, a correlator/demodulator 218, storage sites 220 and readout 224.

The sensing 212 and demodulation 218 can be done using dynamic lateral drift fields as described in U.S. Pat. No. 7,498,621 B2, which is incorporated herein in its entirety, or static lateral drift fields as described in U.S. Pat. Appl. No. 2008/0239466 A1, which is incorporated herein in its entirety. Various approaches have been published based on the static lateral drift field principle B. Büttgen, F. Lustenberger and P. Seitz, Demodulation Pixel Based on Static Drift Fields, IEEE Transactions on Electron Devices, 53(11):2741-2747, November 2006, Cédric Tubert et al., High Speed Dual Port Pinned-photodiode for Time-Of-Flight Imaging, International Image Sensor Workshop Bergen 2009, and D. Durini, A. Spickermann, R. Mandi, W. Brockherde, H. Vogt, A. Grabmaier, B. Hosticka, "Lateral drift-field photodiode for low noise, high-speed, large photoactive-area CMOS imaging applications", Nuclear Instruments and Methods in Physics Research A, 2010. Other methods do not have the photosensitive area 212 and the demodulation 218 physically separated such as the photodetection assisted by switching majority currents, see M. Kuijk, D. van Niewenhove, "Detector for electromagnetic radiation assisted by majority current", September 2003, EP 1 513 202 A1, or the methods based on toggling large transfer gates, see U.S. Pat. No. 5,856,667, U.S. Pat. No. 6,825,455, and US 2002/0084430 A1. All of those sensing/demodulation methods can be implemented here.

Figure 4:
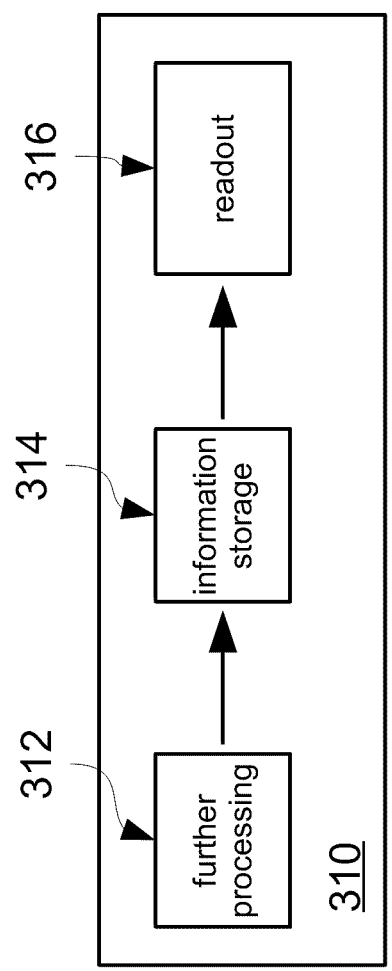
FIG. 4 is a block diagram showing the functions of a general proxel.

FIG. 4 shows the functions of the storage elements or proxels 310. A further processing unit 312 provides further processing of the signals from the associated pixel, an information storage unit 314 stores the generated information, and a data readout unit 316 enables the information readout. Instead of reading out the pixel matrix 110, the proxel array 150 is readout.

Demodulation sensors using the present technology can provide a number of advantages. For example, the pixel size can be reduced without giving up fill factor and data quality of every individual pixel. It also can provide high flexibility for the integration of more processing steps that are applied to the pixels' outputs. These include dynamic range enhancement, pixel-wise integration time control, several storage capacitance providing charge overflowing capabilities, background suppression by capacitance switching, increasing the number of sampling points when demodulation pixels are used, and appropriate capacitance switching in the proxel from integration period to integration period to remove mismatch problems inside the pixel.

Figure 5:
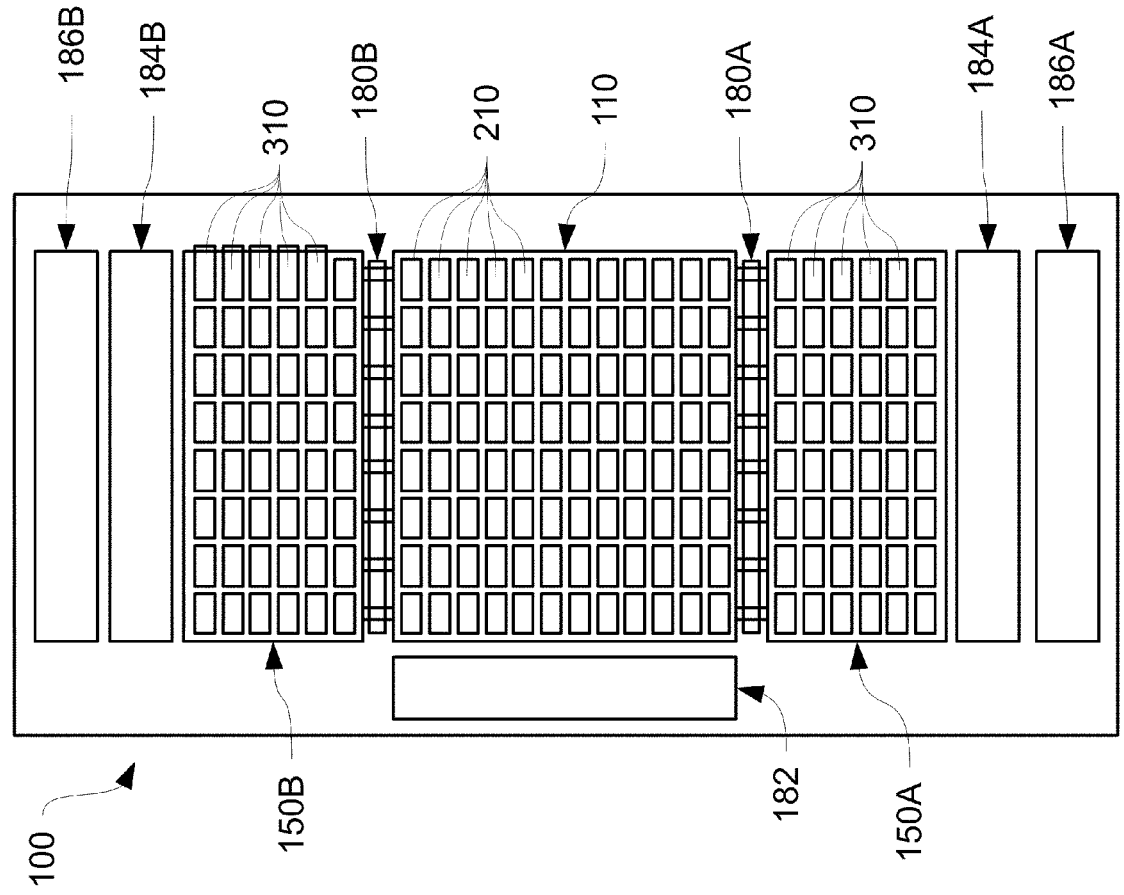
FIG. 5 is a schematic diagram showing an electronic imaging sensor with one pixel matrix and two proxel arrays for speeding up the time required for shifting the information from the pixels to the proxels.

FIG. 5 shows the sensor with a pixel array 110 of pixel 210 and a split proxel array comprising a first proxel array 150A and a second proxel array 150B of proxels 310. By putting half of the proxel array on top (150B) and the other half (150A) below the pixel array 110, the signal shift from the pixels 210 to the proxels 310 is accelerated by parallelization of the data flow. Furthermore, splitting the proxel array reduces the space restrictions in the design.

Likewise, the signal post processing is split into a first signal post processing unit 184A for the first proxel array 150A and a second signal post processing unit 184B for the second proxel array 150B. Two proxel readout decoders 186A, 186B are similarly provided.

In the following some more proxel designs are disclosed. The integration of those functionalities into every pixel becomes only indirectly possible by excluding those particular steps of processing out of the pixel array. The examples show two connections between a pixel 210 and a proxel 310 in order to point out the functionality integrated in the proxel array.

Additionally, it is easily possible to combine the different examples.

Figure 6:
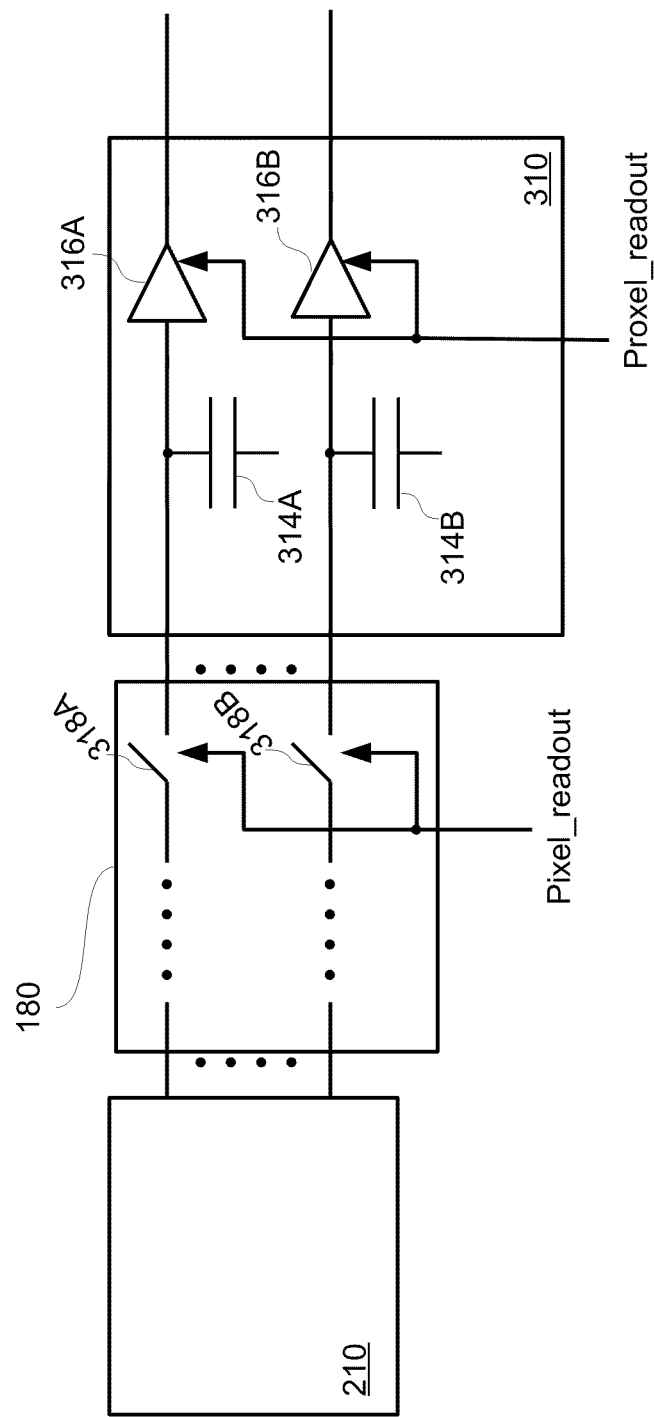
FIG. 6 is a circuit diagram showing a proxel for charge storage in the analogue domain.

FIG. 6 shows the separation of the charge storage elements from the photo-sensitive pixel array. In more detail, the pixel 210 has an arbitrary number of output lines in the transfer or connection system 180. In the illustrate example the number of pixel outputs is two, n=2, but in other embodiments, n=4 or more. The proxel provides the same number of storage nodes 314A, 314B (indicated by capacitances). Buffer elements or readout amplifiers 316A, 316B enable the readout of the analog values stored by the storage nodes 314A, 314B when activated by a select signal called Proxel_readout controlled by the proxel readout decoder 186. The transfer of the information (charges) from the pixel 210 to the proxel 310 is realized by connecting both elements together via switches 318A, 318B in the output connection lines 180. These switches are activated by the signal called Pixel readout which is controlled by the pixel readout decoder 182.

Figure 7:
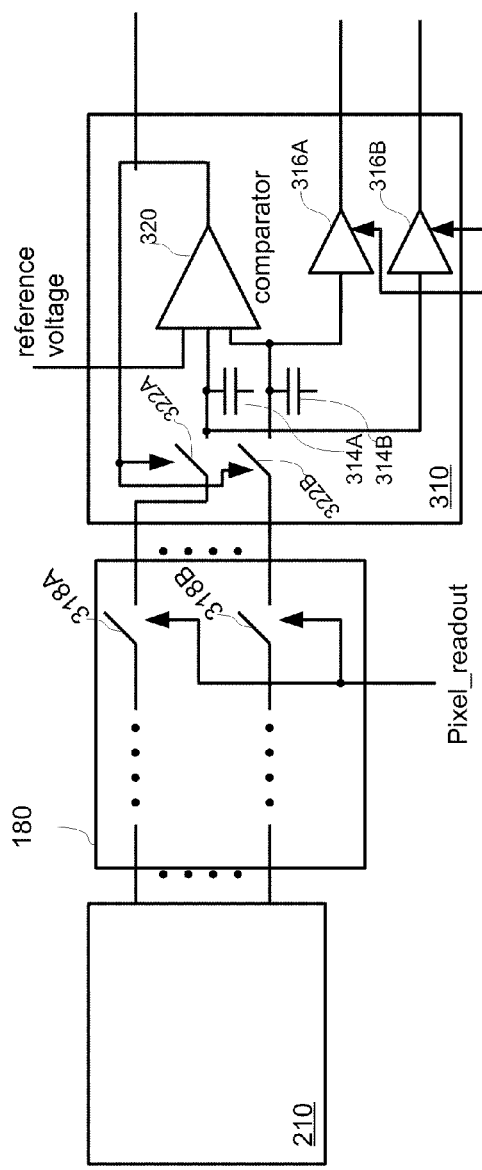
FIG. 7 is a circuit diagram showing a proxel with integration time control feature.

FIG. 7 shows an embodiment that allows for automatic integration control on the proxels 310. Consequent sub-images are captured and transferred via transfer or connection system 180 from the pixels 210 to the proxels 310. The information of the pixel 210 are stored and integrated for the subimages on the capacitors 314A, 314B in the proxel 310. If their voltage crosses a reference voltage, e.g. saturation indicating threshold, the comparator 320 deactivates all subsequent information transfer processes by controlling the switches 322A, 322B. In case of demodulation pixels 210, where several samples might need to be stored, the saturation of a single sample is fed back to preferably open the switches 322 of all the samples in the proxel 310 for the subsequent sub-images of the acquisition.

Figure 8:
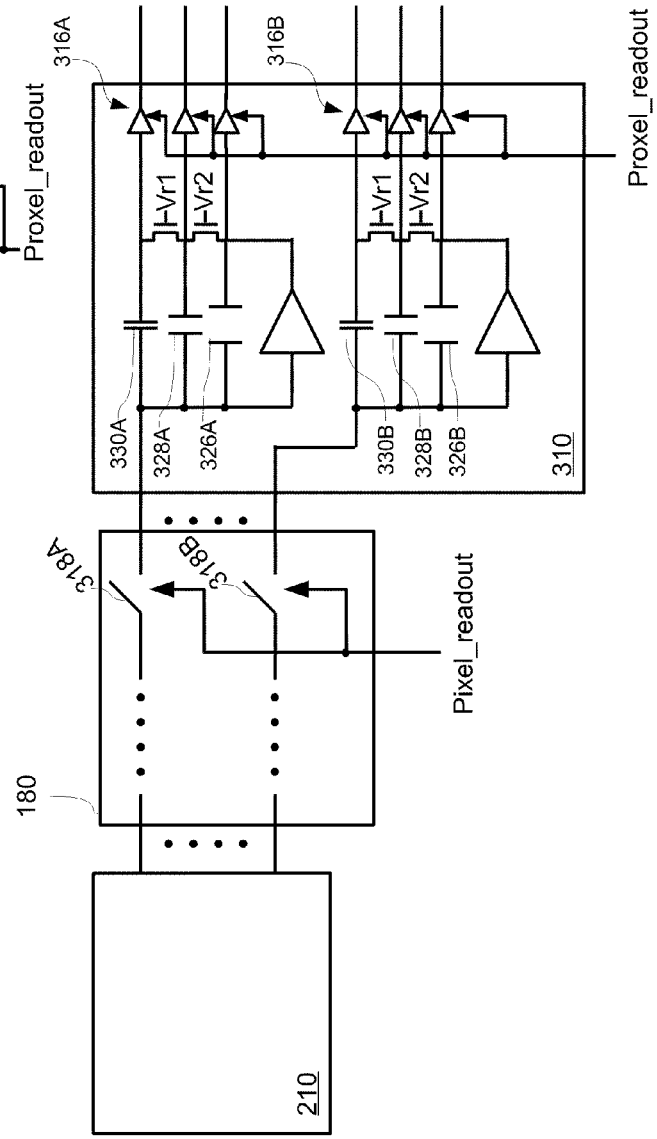
FIG. 8 is a circuit diagram showing a proxel with varying output sensitivity.

FIG. 8 shows an example for a proxel 310 that enables operation with a higher dynamic range. The photo-generated charge is transferred from the pixel 210 via transfer or connection system 180 onto a first capacitance 326A, 326B for each pixel output in the proxel 310. If the voltage extends a reference voltage Vr2, charge flows to intermediate capacitance 328A, 328B. If the voltage exceeds Vr1, then charge flows to large capacitance 330A, 330B, where Vr1<Vr2. Thus in this configuration, low signals are integrated on small capacitances providing a high sensitivity. Large or strong signals are integrated on large capacitances, meaning a lower output sensitivity but an increased dynamic range that enables the sensor to operate in environments with high background light levels, such as in outdoor, daytime operation.

Figure 9:
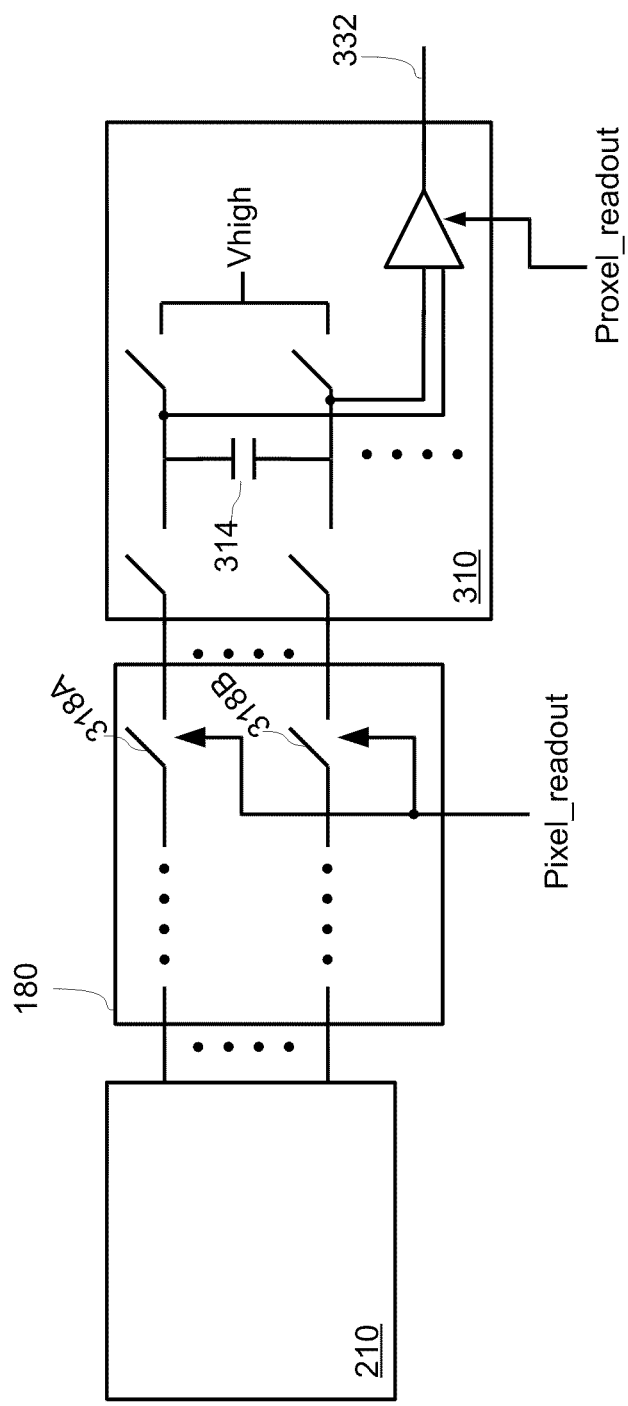
FIG. 9 is a circuit diagram showing a proxel with circuitry for DC signal suppression.

FIG. 9 shows an embodiment where the proxel 310 has DC suppression capabilities. Typically demodulation pixels provide a certain number of sampling outputs and often the difference between those sample values is needed. By subtracting the samples in the analog domain, the DC components that do not contribute to the information extraction but lead to early saturation can be suppressed.

The proxel 310 shows the DC suppression circuitry applied on two pixel outputs. Several of those circuitries could be integrated in the proxel, if there is the need to subtract even more pixel outputs.

By appropriate timing of the switching, the DC component between the channels integrated on consequent sub-images can be subtracted and integrated on capacitance 314.

A differential output 332 is used for the buffering during readout.

The sample outputs of demodulation pixels are generally referred to as taps. Hence, a 2-tap demodulation pixel provides n=2 sample outputs. In the case that this pixel is used for example for sampling a sinusoidally intensity-modulated light wave four times at equidistant steps of 0°, 90°, 180° and 270°, then two subsequent measurements need to be performed. A first measurement outputs the samples at for example 0° and 180° and a second integration cycle give the samples at 90° and 270° phase.

However, if a 4-tap pixel structure is available, all n=4 samples are obtained within one acquisition cycle. The proxel approach enables the use of a 2-tap pixel structure for obtaining all 4 samples within one single acquisition cycle. The proxel 310 is used to increase the sample number from n=2 to n=4.

Generally the concept can be extended to pixel structures of arbitrary tap numbers and to proxel structures that increase the number arbitrarily.

Figure 10:
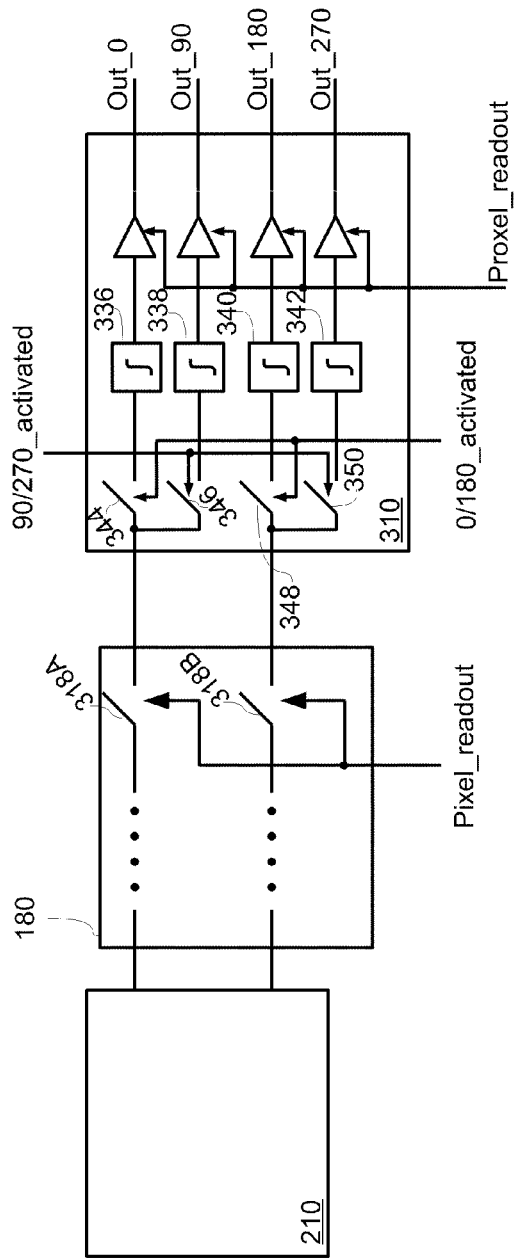
FIG. 10 is a circuit diagram showing a proxel with capabilities for increasing the number of sampling per demodulation pixels.

FIG. 10 shows the special case of transforming a 2-tap pixel structure to a 4-tap proxel structure. Switches 344 and 348 are closed during a first phase of operation. Charges from the pixel 210 on output line of the transfer or connection system 180 are transferred by the closing of switches 344 and 348 to charge storage sites 336, 340 during the capture of 0/180° information. During the next phase, charges from the pixel 210 on output line 180 are transferred by the closing of switches 346 and 350 to charge storage sites 338, 342 during the capture of 90/270° degree information.

Figure 11:
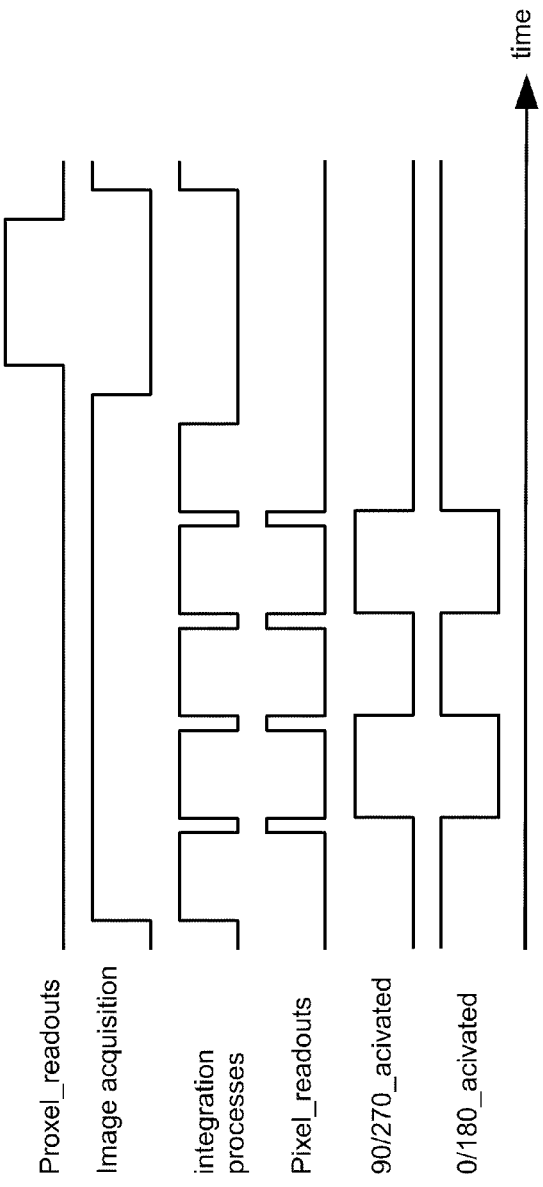
FIG. 11 shows a timing diagram for the proxel of FIG. 10.

FIG. 11 is a timing diagram corresponding to FIG. 10. For each integration process, the sampling process switches between the acquisition of the phases 0/180° and 90/270°. The digital signals 0/180_activated and 90/270_activated determine which samples are currently acquired, either 0° and 180° or 90° and 270°, respectively. According to this switching scheme, the two output values of the pixel are transferred onto the corresponding integration stages 336, 340 or 338, 342 in the proxel 310. The switches 344, 346, 348, 350 in the proxel 310 are controlled by the 0/180_activated and 90/270_activated signals.

The four outputs of the pixel are denoted by Out_0, Out_90, Out_180 and Out_270, according to the particular phase value that the sample is representing.

Figure 12:
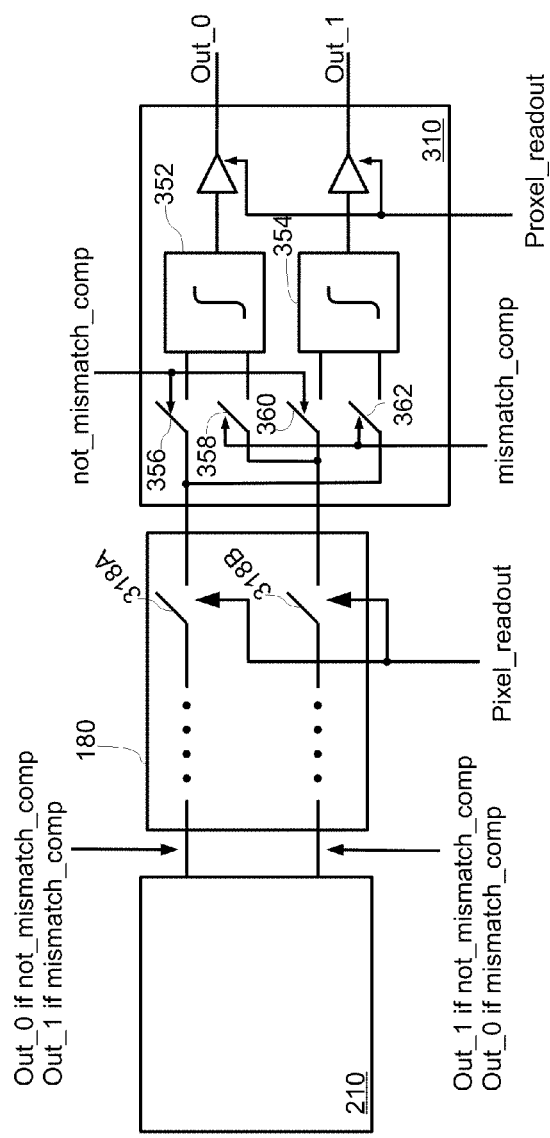
FIG. 12 is a circuit diagram showing a proxel with mismatch compensation capabilities.

FIG. 12 shows a proxel circuit that allows for compensating in-pixel mismatches between the analog paths. Referring to the example of a demodulation pixel 210 with two outputs in the transfer or connection system 180, the pixel outputs are connected alternately to the two integration elements or storage nodes 352, 354 in the proxel 310 by the closing of switches 356 and 360 and then by the closing of switches 358 and 362. The alternation is performed between the subsequent integration processes within one full acquisition cycle. At least two, but preferably many subsequent images are acquired within one full acquisition cycle.

Figure 13:
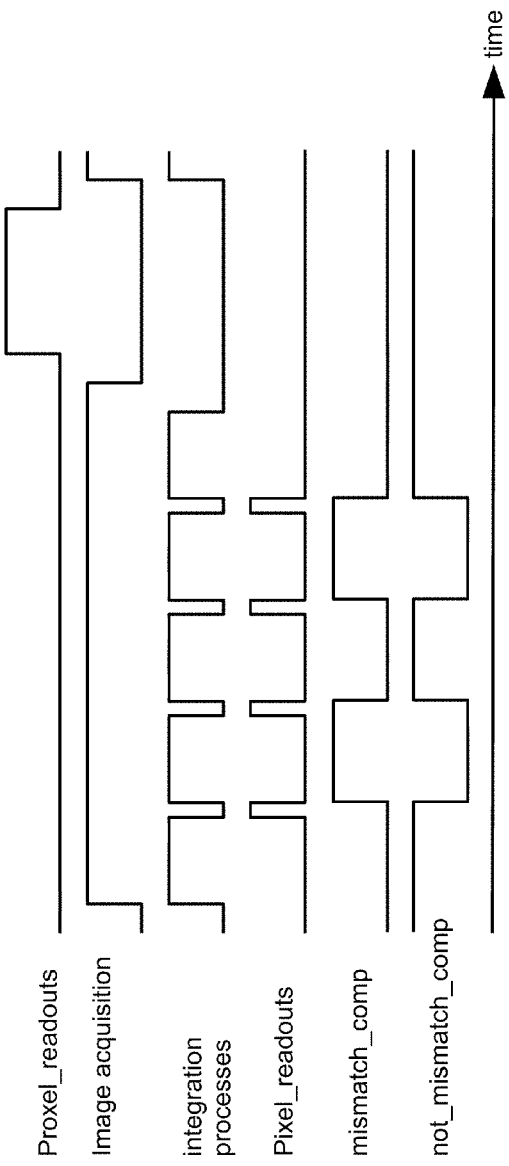
FIG. 13 shows a timing diagram for the proxel of FIG. 12.

FIG. 13 shows the timing diagram illustrating in more detail the change of the pixel-proxel connections for the subsequent integration processes. The signals mismatch comp and not_mismatch_comp control the corresponding switches 358/362 and 356/360, respectively, that realize the connections between the pixel's outputs 180 and the proxel's integration nodes 352, 354. The pixel operation needs to be alternated accordingly so that the physical output paths are changed with the mismatch comp respectively not_mismatch_comp signals, but the logical sample values are always connected to the same integration elements within the proxel.

Figure 14:
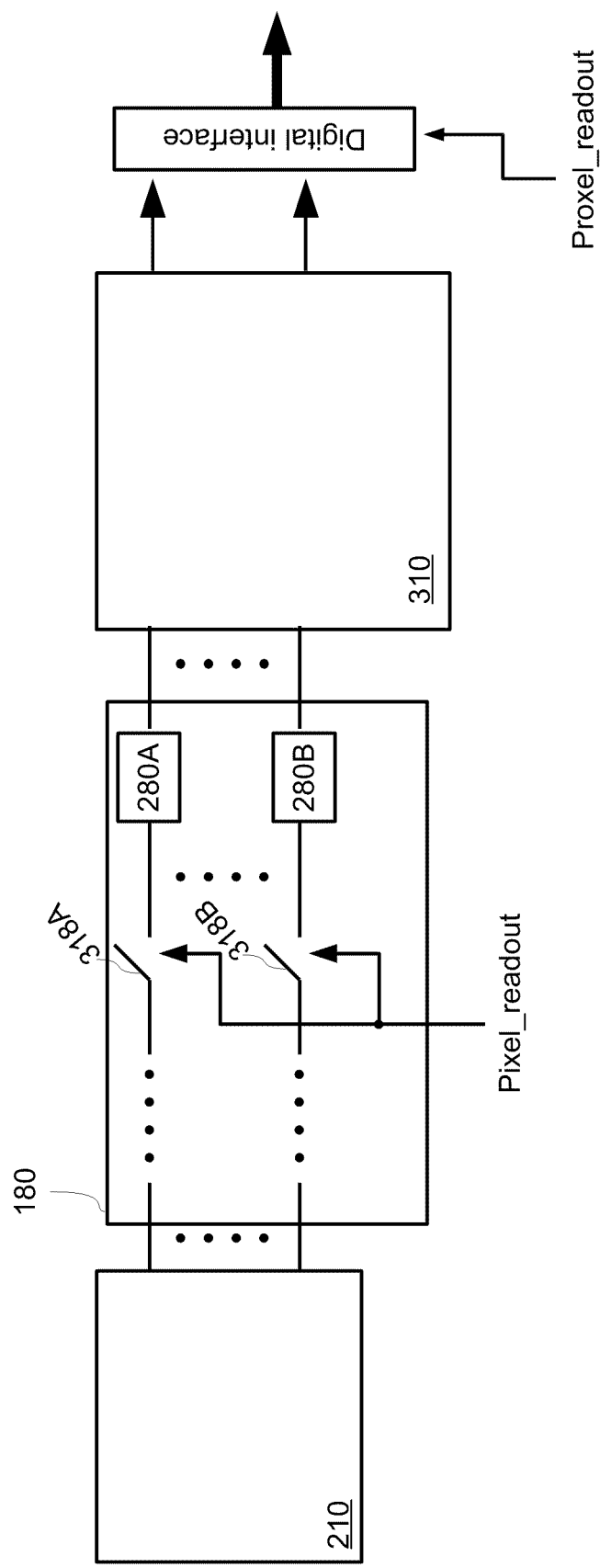
FIG. 14 shows a diagram showing the pixel-proxel connection including an analogue to digital converter.

FIG. 14 shows the pixel to proxel transfer or connection system 180 converting the information into the digital domain. Hence, the proxel 310 deals now with digital values. The illustration in FIG. 14 shows one analog to digital converter per output line. Depending on the specifications, other analog to digital conversion setups such as multiplexed, serialized, pipelined or combinations are imaginable. The conversion into the digital domain opens up many possibilities for processing the data in different ways in the proxel 310. The aforementioned processing tasks such as integration, mismatch cancellation, increasing the number of samples, background subtraction, or varying sensitivities can now be performed digitally inside the proxel 310. Furthermore, digital binning of several proxels is possible. In case of demodulation pixels for 3D imaging, proxels might even perform in its post-processing full phase/distance calculation and even do calibration such as subtraction of reference measurements. A possible conversion of sampled data into a digital values is illustrated in more detail by Oggier, Lehmann, Buettgen, in On-chip time-based digital conversion of pixel outputs, of U.S. Pat. Appl. No. US 2009/0021617A1, which is incorporated herein in its entirety by this reference.

FIG. 15 shows the timing diagram of a typical 2-tap demodulation pixel 210. In the case of a mismatch cancellation approach, four images are acquired. In the first acquisition, output 1 supplies the sample at 0° while output 2 captures sample 180°. The data are then transmitted off-chip and stored off-chip. The second acquisition captures 90° and 270°. In order to cancel sampling and channel mismatches, the third acquisition just reverses the sampling compared to the first. Output 1 delivers 180° and output 2 captures 0°. In the final fourth image, output 1 contain sampled at 270° and output 2 on 90°. All four images of both channel are transferred off-chip and then used to calculate phase, amplitude and offset.

FIG. 16 is a timing diagram illustrating the operation of the sensor 100 providing the same mismatch cancellation method on a 2-tap pixel architecture. The different integrations of the samples are much shorter and the different integrations of the samples better mixed during the overall image acquisition. The proxels enable the intermediate storage on-chip. This allows faster readout and for this reason the different samples can be captured much closer to each other and therefore reduce motion artifacts.

FIG. 17 is a timing diagram illustrating the operation of the sensor 100 to enhance the dynamic range. The sub-integrations have different exposure times. Each proxel 310 evaluates for each pixel 210 the quality of the subsequent sample. In general, saturation and signal to noise is checked. In case of good quality, the captured sample value of the subsequent acquisition is integrated in the proxel. The specific example shows again the integration and output timing of a 2-tap pixel sensor with mismatch cancellation. Such timing can be applied in combination with the digital conversions and proxel from FIG. 14 but also all the other aforementioned proxel embodiments.

In summary, a new concept for the design of image sensors has been demonstrated that allows for down-scaling the pixel size without compromising in the pixels' signal storage performances. The idea is based on keeping only the absolute necessary storage nodes inside the pixel, which still ensure intermediate signal storage, and further on extracting the final storage nodes to an on-chip array of storage elements out of the pixel field. Furthermore, the creation of an external array of elements, where each element is linked to a particular pixel, enables new functionalities. Analogue and digital processing circuitries can now be integrated on sensor-level in a very flexible fashion without affecting the photo-sensitivity of the pixel at all. The flexibility of integrating further processing steps for each pixel is a benefit for so-called demodulation pixels. Without adjusting the pixel architecture, different concepts like for example multi-sampling or in-pixel mismatch compensation can easily be achieved.

While this invention has been particularly shown and described with references to preferred embodiments thereof, it will be understood by those skilled in the art that various changes in form and details may be made therein without departing from the scope of the invention encompassed by the appended claims.

What is claimed is:

1. A demodulation sensor implemented on a chip, comprising:
   a pixel array comprising pixels each of which produces at least two samples of a scene, which is illuminated by modulated light from a light emitter;
   a proxel array on the chip, the proxel array being physically separated from the pixel array and comprising storage elements and processing elements, each of the storage elements operable to receive the at least two samples from a corresponding one of the pixels; and
   a transfer system to transfer the samples from the pixel array to the corresponding storage elements of the proxel array;
   wherein the proxel array is arranged to alternate storage of the at least two samples between two different storage elements to perform in-pixel mismatch cancellation, and wherein each storage element is arranged to accumulate a plurality of phase-delay-matching sub-images for a single image.

2. A demodulation sensor as claimed in claim 1, wherein the pixels comprise:
   photosensitive regions in which incoming light generates charge carriers, and demodulators/correlators that transfer the charge carriers among multiple storage sites.

3. A demodulation sensor as claimed in claim 1, wherein the processing elements monitor storage elements that receive the samples for saturation.

4. A demodulation sensor as claimed in claim 3, wherein a voltage of one or more of the storage elements is continuously monitored by a comparator to determine whether the voltage has reached a predetermined saturation indicating reference voltage.

5. A demodulation sensor as claimed in claim 1, further comprising a post processing unit for determining depth information.

6. A demodulation method, comprising:
   detecting modulated light in a pixel array, which is implemented on a chip, the pixel array comprising pixels each of which produces at least two samples of the modulated light with the modulation of a light emitter;
   transferring the samples from each of the pixels to a proxel array on the chip, the proxel array being physically separated from the pixel array and comprising storage elements and processing elements; and
   receiving the at least two samples in storage elements of the proxel array from a corresponding one of the pixels, wherein individual ones of the storage elements accumulate signals for a plurality of phase-delay-matching sub-images corresponding to a single image.

7. The demodulation sensor of claim 1 wherein the at least two samples are acquired per period of modulating light generated by a light source.

8. The demodulation sensor of claim 1 wherein each proxel in the proxel array is associated with a particular pixel in the pixel array.

9. A demodulation sensor as claimed in claim 1, wherein each storage element is arranged to accumulate a two phase-delay-matching sub-images for a single image.

10. A demodulation sensor as claimed in claim 1, wherein each storage element is arranged to accumulate a four phase-delay-matching sub-images for a single image.

11. A demodulation sensor as claimed in claim 1, wherein the storage elements include capacitive storage sites.

12. A demodulation sensor as claimed in claim 1 wherein the proxel array comprises a first group of storage elements operable to accumulate photogenerated charge for a first one of the samples and a second group of storage elements operable to accumulate photogenerated charge for a second one of the samples, wherein, for each of the first and second groups of storage elements, if an amount of charge stored on a first one of the storage elements in the group exceeds a predetermined amount, overflow charge is stored on a second one of the storage elements in the same group.

13. A demodulation sensor as claimed in claim 12, wherein each of the first and second groups of storage elements comprises a plurality of capacitive storage sites.

14. A demodulation sensor as claimed in claim 13, wherein, for each of the first and second groups of storage elements, if a voltage across a first one of the capacitive storage sites in the particular group exceeds a first amount, overflow charge is accumulated by a second one of the capacitive storage sites in the same group, and if a voltage across a second one of the capacitive storage sites in the particular group exceeds a second amount, overflow charge is accumulated by a third one of the capacitive storage sites in the same group.

15. A demodulation sensor as claimed in claim 14, wherein the first, second and third capacitive storage sites in a particular one of the first or second groups is operable to accumulate a different amount of photogenerated charge from one another.

16. A demodulation sensor as claimed in claim 1 wherein the transfer system comprises analog-to digital conversion circuitry that converts the samples from analog to digital so that the samples received for processing by the proxel array are digital.

17. The demodulation method of claim 6 including:
converting the at least two samples of each of the pixels from analog signals to digital signals; and
transferring the digital signals for each of the pixels to the proxel array.

* * * * *